(12) United States Patent
Hubert

(10) Patent No.: US 6,244,541 B1
(45) Date of Patent: Jun. 12, 2001

(54) DEVICE FOR SUSPENSION OF A PAYLOAD IN A SPACE LAUNCH

(75) Inventor: Pascal Marie-Dominique Hubert, Bitche (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/341,710
(22) PCT Filed: Jan. 29, 1998
(86) PCT No.: PCT/FR98/00167
§ 371 Date: Jul. 29, 1999
§ 102(e) Date: Jul. 29, 1999
(87) PCT Pub. No.: WO98/32658
PCT Pub. Date: Jul. 30, 1998

(30) Foreign Application Priority Data

Jan. 29, 1997 (FR) .................................................. 97 00949

(51) Int. Cl.[7] ..................................................... B64G 1/22
(52) U.S. Cl. ........................ 244/158 R; 244/54; 244/636
(58) Field of Search ................................. 244/158 R, 54; 188/378, 267; 248/554, 573, 635, 634, 636, 604, 560, 563, 603; 267/141.3, 141.2, 153

(56) References Cited

U.S. PATENT DOCUMENTS

| | | | |
|---|---|---|---|
| 2,047,963 | * 7/1936 | Hoffman | 244/54 |
| 2,999,707 | * 9/1961 | Kniepkamp et al. | 267/141.3 |
| 3,222,017 | * 12/1965 | Bobo | 244/54 |
| 3,351,308 | * 11/1967 | Hirst | 248/563 |
| 4,285,553 | * 8/1981 | Robinson | 310/90.5 |
| 4,361,296 | * 11/1982 | Hall et al. | 244/54 |
| 4,811,919 | * 3/1989 | Jones | 244/54 |
| 4,848,525 | 7/1989 | Jacot et al. | 188/378 |
| 5,219,051 | * 6/1993 | Davis | 188/378 |
| 5,244,170 | * 9/1993 | Shekher | 244/158 R |
| 5,878,980 | * 3/1999 | Cooley, Jr. | 244/172 |
| 6,012,680 | * 1/2000 | Edberg et al. | 244/158 R |

FOREIGN PATENT DOCUMENTS

| | | |
|---|---|---|
| 0 727 351 | 8/1996 | (EP) . |
| 252843 | 6/1926 | (GB) . |
| 2 029 546 | 3/1980 | (GB) . |
| 54-047075 | 4/1979 | (JP) . |

* cited by examiner

Primary Examiner—Galen L. Barefoot
(74) Attorney, Agent, or Firm—Jacobson, Price, Holman & Stern, PLLC

(57) ABSTRACT

A device for the suspension of a payload in a space launch including annular chambers of fluid with variable geometry installed between the launch and the payload and first and second rigid members fixed, on either side of the chambers, to the payload and to the launch respectively so as to transmit the stresses between the latter through the chambers. The fluid chambers and the first and second rigid coupling members are coextensive, ring-shaped and coaxial with a longitudinal axis common to the launch and to the payload. The first and second annular rigid coupling members each include external and internal ribs respectively, axially separated by one of the annular fluid chambers.

27 Claims, 2 Drawing Sheets

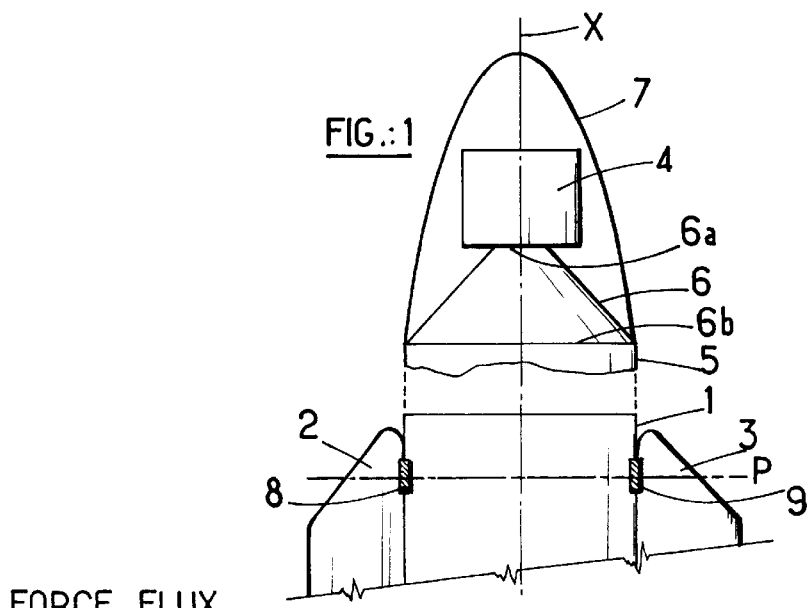
FIG.:1
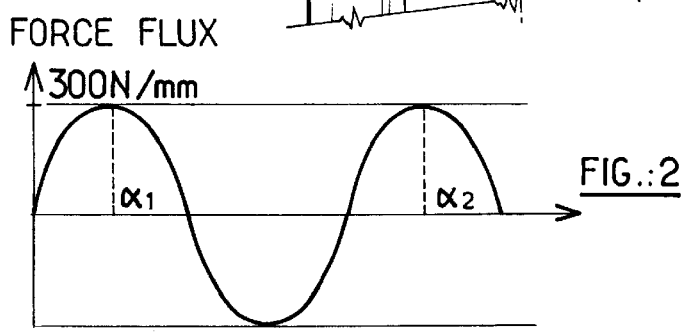
FIG.:2
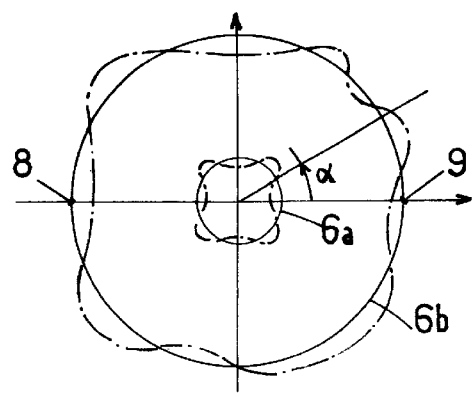
FIG.:3
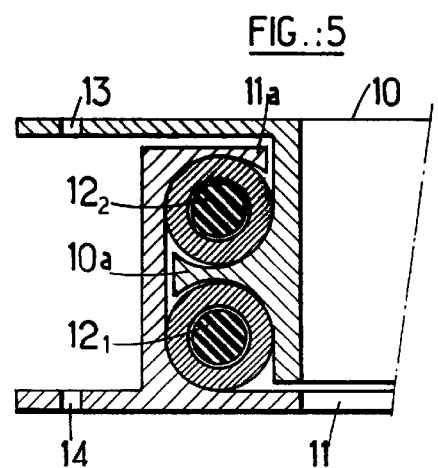
FIG.:5
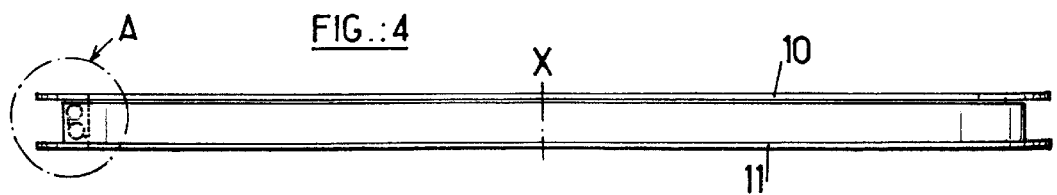
FIG.:4

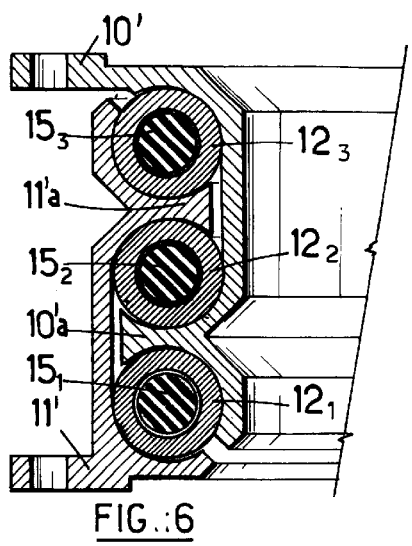
FIG.:6
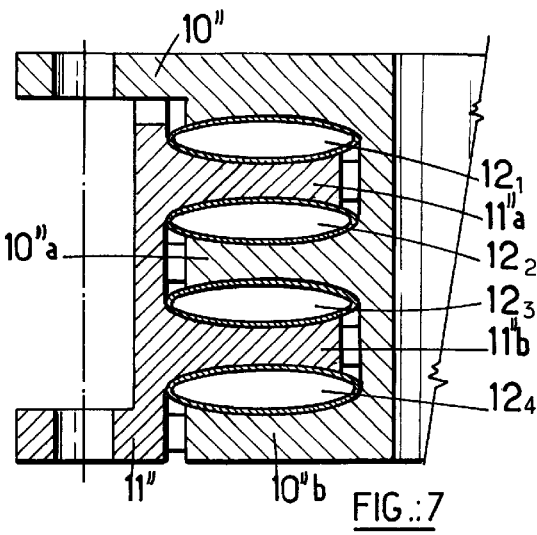
FIG.:7
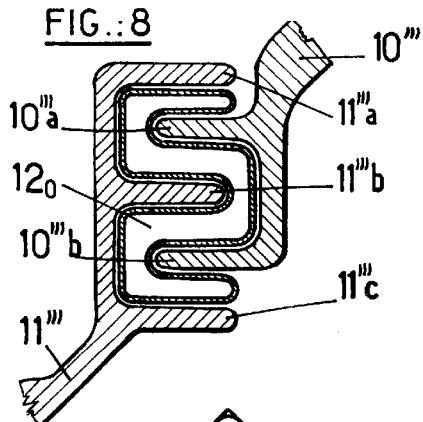
FIG.:8
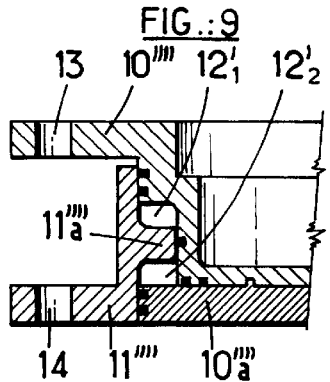
FIG.:9
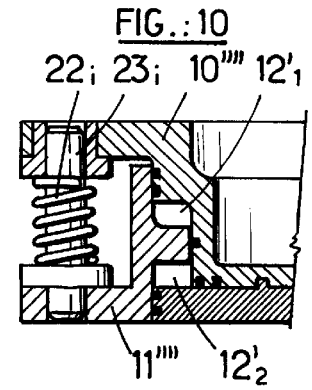
FIG.:10
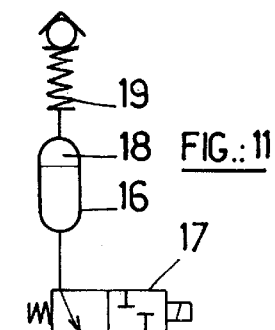
FIG.:11
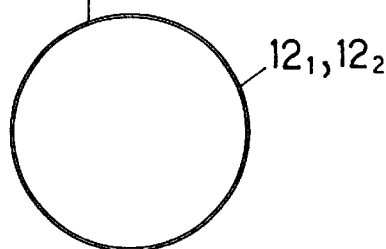
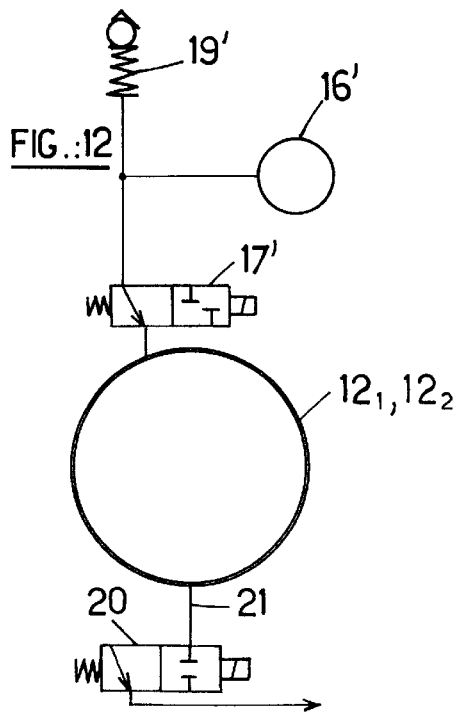
FIG.:12

DEVICE FOR SUSPENSION OF A PAYLOAD IN A SPACE LAUNCH

The present invention relates to a system for suspending a payload and more particularly a system of this kind installed in a space launch vehicle for said payload. Hereinafter, the term "payload" covers equally a satellite, a crew or freight transport vehicle or an orbital station component, although this is not limiting on the invention.

A launch vehicle for spacecraft such as satellites conventionally comprises a plurality of propulsion stages activated successively during the launch phase. One solution to the problem of increasing the power of the launch vehicle if it has to place a particularly large payload in orbit is to mount auxiliary propulsion units on the first propulsion stage of the launch vehicle. These are commonly known as "boosters". FIG. 1 of the accompanying drawings is a diagrammatic representation of part of a launch vehicle of this kind whose first stage 1 is equipped with two boosters 2 and 3 fixed in diametrally opposite positions to the envelope of the stage and parallel to its longitudinal axis X. FIG. 1 also represents diagrammatically a satellite 4 mounted on a second stage 5 of the launch vehicle by means of an adapter in the form of a frustoconical skirt 6. The satellite is conventionally protected by a nose cap 7 while it is passing through the atmosphere.

When the boosters 2 and 3 operate during launch, the thrust that they develop applies intense forces, in the order of several hundred tons, for example, to the envelope of the first stage 1, in particular at the respective points 8, 9 at which the boosters 2, 3 are attached to the first stage.

FIG. 2 is a graph showing the distribution of these forces over the envelope of the first stage in a plane P passing through the attachment points 8 and 9. To be more precise, the "flux" of force exerted on the envelope (in N/mm of its circumference) at any point on that circumference having an angular abscissa $\alpha$ in the plane P ($0 \leq \alpha \leq 2\pi$) is plotted on the ordinate axis.

There are significant force flux maxima ("superfluxes"), in the order 300 N/mm, for example, at the points with angular abscissae $\alpha_1$ and $\alpha_2$ corresponding to those of the points 8 and 9 where the boosters are attached to the first stage 1. This results in marked non-uniformity of the flux around the circumference of the stage 1, causing asymmetric deformation of the envelope of the stage, and this deformation can even vary in time.

FIG. 3 shows in chain-dotted outline, and greatly exaggerated to clarify the drawing, typical deformations observed at the smaller base 6a and the larger base 6b of the skirt 6 as a consequence of the transmission to the skirt of deformations of the envelope of the first stage 1, which are in turn transmitted to the envelope of the second stage 5 that supports said skirt.

The figure shows that the smaller base 6a of the skirt 6 is subject to deformations which clearly can seriously interfere with the structure and operation of the satellite 4 mounted on the skirt.

What is more, at the various separations of the stages of the launch vehicle, the nose cap or the satellite, high intensity shocks can propagate in the structure of the launch vehicle and the satellite. Similarly, vibrations due to variations in thrust and to engine ignition and extinction occur throughout the flight. Clearly these shocks and vibrations can also interfere with the operation of the launch vehicle and on-board satellites.

If it is not possible to prevent the generation of the force flux maxima, shocks and vibrations mentioned above, it is necessary to take steps so that these have no significant effect on the structure and operation of the launch vehicle and the on-board satellite(s). Concerning the satellites in particular, the smaller base 6a of the skirt 6 which carries the satellite 4 must not be subject to significant deformations or peak forces likely to interfere with the operation of the satellite.

One prior art technique for this reinforces the skirt 6 in the vicinity of its smaller base 6a using a very rigid carbon fibre annular reinforcing frame fixed to its inside face. Using a single frame of this kind, which is heavy and costly, has proved to be insufficient. Satellite manufacturers do not allow a peak force flux exceeding 10 N/mm at the level of the base of the satellite. It has been found that this constraint, imposed by their specifications, can be met only by disposing at least two such reinforcements in the skirt, rather than only one, which makes this solution even more costly.

What is more, these reinforcements are specific to a particular adapter skirt, suited to a particular satellite to be placed in orbit. It is therefore necessary to construct and install as many dedicated reinforcements as there are types of adapter skirt, which further adds to the cost of using reinforcements.

Prior art solutions to the problem of the shocks and vibrations generated when the stages of the launch vehicle separate essentially consist in using smaller pyrotechnic charges for such separations or reducing the thickness of the members that the charges cut. Another proposed solution is to line the envelope or shell of the launch vehicle with elastomer material to dissipate the energy of the shocks. These solutions have the drawbacks of being costly and difficult to put into practice.

The present invention therefore aims to provide a system, designed to be mounted between a launch vehicle component and a satellite transported by the launch vehicle, which is light and adapted to prevent transmission to the satellite of force flux maxima, shocks or vibrations that could disrupt its structure and/or its operation.

Another aim of the present invention is to provide a system of the above kind which provides a sufficiently rigid connection between the launch vehicle and the satellite or between the launch vehicle and a component thereof supporting the satellite, to secure them together and to withstand forces applied by the satellite itself.

A further aim of the present invention is to provide a suspension system of the above kind which is reliable and fault-tolerant. The latter is an important constraint in the space industry where failure of a launch vehicle unit must not imperil the entire mission.

The above aims of the invention, and others that will become apparent on reading the following description, are achieved with a system for suspending a payload in a launch vehicle for launching said payload into space, characterised in that it comprises a) at least one variable geometry annular fluid chamber installed between said launch vehicle and said payload, and b) first rigid members and second rigid members fixed on either side of said chamber to said payload and to the launch vehicle, respectively, so as to transmit forces between them via said chamber.

As shown below, the localised force flux maxima that reach the system are de-localised and therefore strongly attenuated and distributed throughout the chamber by the constant pressure volume of the fluid contained in the chamber.

According to other features of the system in accordance with the invention, said annular fluid chamber and said first and second rigid coupling members are coextensive and coaxial with a longitudinal axis common to the launch vehicle and the payload. Each of said first and second rigid annular coupling members advantageously has at least one external rib and at least one internal rib separated axially by said annular fluid chamber.

In a first embodiment of the invention, the annular fluid chamber has a flexible wall.

In a first variant, the ribs of said first and second rigid annular members are interleaved with each other with said fluid chamber between the faces of each pair of facing faces of said interleaved ribs.

In a second variant, the system comprises at least one first annular fluid chamber and one second annular fluid chamber superposed axially, the ribs facing the rigid annular members respectively compressing the first chamber or the second chamber when said rigid members are subjected to forces respectively tending to move them closer together or farther apart.

In a third variant, the system comprises at least one third fluid chamber coaxial with the other two, disposed symmetrically with the first one relative to the second one and functioning like the first one.

In another embodiment of the invention, the system comprises a fourth fluid chamber coaxial with the others, disposed symmetrically with the second one relative to the third one and functioning like the second one.

In a second embodiment of the invention, the annular fluid chamber is delimited by complementary surfaces of the first and second mobile members which are mobile relative to each other along the longitudinal axis of the launch vehicle.

The system may further comprise means for adjusting the pressure of a gaseous fluid contained in a fluid chamber or means for selectively establishing communication between at least one chamber containing an incompressible fluid and a tank containing a compressible fluid.

As shown below, the aforementioned means enable the system in accordance with the invention to be given a flexibility, a rigidity or a damping capacity adapted to suit the forces, vibrations or shocks on the launch vehicle and the satellite during launch.

Other features and advantages of the present invention will become apparent on reading the following description and examining the accompanying drawings, in which:

FIG. 1 is a diagrammatic elevation view of a prior art satellite launch vehicle which can be equipped with the suspension system of the present invention, FIG. 2 is a graph and FIG. 3 is a diagram which are referred to in the preamble of the present description, in conjunction with FIG. 1, to explain the problems solved by the present invention, FIG. 4 is a diagrammatic view in axial section of one embodiment of the system of the invention, FIG. 5 shows the detail A from FIG. 4, FIGS. 6 to 8 are partial representations analogous to the detail A of variants of the system from FIGS. 4 and 5, FIG. 9 is a partial diagram of another embodiment of the system of the invention, FIG. 10 is a diagram of a variant of the system from FIG. 9, and FIGS. 11 and 12 are respectively diagrams of means for adjusting the pressure of an incompressible fluid and a gas contained in at least one of the fluid chambers of the system of the invention.

FIGS. 4 and 5 of the accompanying drawings show a first embodiment of the suspension system of the invention, which essentially comprises two rigid annular members or rings 10 and 11 made of metal, for example, and first and second annular pressurised liquid or gaseous fluid chambers or jackets $12_1$, $12_2$ at the periphery of and between the rings 10 and 11. The rings 10, 11 and chambers $12_1$, $12_2$ are therefore coextensive, i.e. they extend in space substantially parallel to each other. The chambers or jackets are delimited by a flexible wall which can be deformed by crushing forces.

To be more precise, respective outer and inner annular ribs 10a, 11a project from the periphery of the respective rings 10 and 11 so that each chamber $12_1$, $12_2$ is clamped radially and axially, either between two ribs, like the chamber $12_2$, or between a rib 10a and the base of the ring 11, like the chamber $12_1$. The chambers are therefore interleaved with the rings 10 and 11 so as to participate in their assembly.

It is also clear that the ribs 10a and 11a rule out assembly by mounting the complete rings 10 and 11 one on the other. In fact, each of the rings is divided into a plurality of members, for example three members in the shape of a 120° arc. The members of the two rings are lined with the chambers $12_1$, and $12_2$ and then interleaved with each other, as shown in FIG. 5. Finally, the members of each ring are butt jointed by any appropriate fixing means.

The resulting system can be installed (see FIG. 1) between a satellite 4 and an adapter skirt 6, at the level of the base 6a of that skirt, or on the satellite itself. It can also be installed between the stage 5 and the larger base 6b of the skirt 6.

The rings 10 and 11 are then respectively fixed to the satellite 4 and the skirt 6 or to the skirt 6 and the stage 5, for example using bolts passing through passages like the passages 13 and 14 distributed all around the periphery of the rings 10 and 11.

Clearly if the system is subjected to forces tending to move the two rings 10 and 11 towards each other, along the axis X of the rings, the chamber $12_1$ is compressed between a face of the rib 10a and the ring 11. Conversely, if the system is subjected to forces tending to move the two rings part, the chamber $12_2$ is compressed between the facing faces of the ribs 10a and 11a.

As can be seen in FIG. 5, axial and radial clearances are provided between the two rings 10 and 11, to allow the relative movement described above between the two rings, preventing any contact between them which could interfere with the operation of the system in accordance with the invention.

Accordingly, when the boosters 2 and 3 are operating during launch of the satellite 4 (see FIG. 1), the local force flux maxima at $\alpha_1$ and $\alpha_2$ on the envelope of the first stage of the launch vehicle, and which propagate as far as the system of the invention, are not transmitted unmodified to the skirt 6 and the satellite 4, as would be the case if there were an absolutely rigid connection instead of the system of the invention.

If this system is installed, for example between the stage 5 and the larger base 6b of the skirt 6, the chamber $12_2$ which "sees" a temporary localised force flux maximum at one or two points ($\alpha_1$ or $\alpha_2$) of its periphery, is pressurised throughout its volume and around its entire periphery, so that the constant pressure volume of the chamber converts the localised flux maximum into a homogeneous small force flux distributed over the entire periphery of the system. This results in much less axial or radial deformation of the skirt, especially at the level of its smaller base supporting a satellite, which protects the structural integrity of the satellite.

Clearly by adjusting the pressure of the fluid in the chamber $12_1$ and $12_2$ to different predetermined levels the system of the invention can be selectively given a stiffness, a flexibility or a force-damping capacity matched to any particular situation arising during launch: operation of the boosters, which generates force flux maxima, separation of a propulsion stage or the nose cap, which generates shocks and/or vibrations, etc.

FIG. 11 shows diagrammatically means for adjusting the pressure of the fluid contained in either of the chambers $12_1$ and $12_2$ and designed for use with an incompressible fluid such as a mixture of oil and liquid nitrogen, for example. The chamber $12_1$ or $12_2$ is filled with said fluid and communicates selectively with a tank 16 of said fluid via a two-way solenoid valve 17. On the ground, the chamber $12_1$ or $12_2$ is filled with said incompressible fluid and pressurised by a volume of gas 18 under pressure fed into the tank 16 via a check valve 19. This pressure can be 45 bars, for example.

The solenoid valve 17 can be opened or closed in flight. When closed, it isolates the chambers $12_1$, $12_2$ from the tank 16 and the chambers, which are filled with an incompressible liquid, have a very high stiffness which is nevertheless suitable for absorbing the force flux maxima to which the structure of the launch vehicle is subjected when the boosters are operating. For separation of a stage or the nose cap 7, temporary opening of the solenoid valve 17 to establish communication between the chambers and the tank can be programmed. The liquid contained in the chambers can then expand into the tank 16 because of the compressibility of the volume of gas 18. The chambers then have a flexibility suitable for absorbing shocks and/or vibrations that occur in particular during the separations referred to above.

Note that, because a liquid is used, the means described above can impart a very high rigidity to the suspension system of the invention without losing the facility to absorb force flux maxima. These means are also very simple, using a single solenoid valve.

FIG. 12 is a diagrammatic representation of another embodiment of the means for adjusting the pressure of the fluid in one or other of the annular chambers $12_1$ or $12_2$, suitable for use when the fluid is compressible. These means comprise a tank 16' of compressed gas, for example helium at 45 bars, for feeding a chamber $12_1$ (or $12_2$) via a two-way solenoid valve 17'. These means establish a pressure of 45 bars, for example, in the annular chamber and re-establish this pressure in the event of leaks by topping up with gas through a filler check valve 19'.

This pressure of 45 bars makes the system of the invention highly rigid, which is suitable for suspending the satellite, or the adapter skirt carrying it, firmly whilst distributing force flux maxima due to the thrust of the boosters 2 and 3 around all of the circumference of the system. In this way it is possible to obtain at all points on this circumference force fluxes less than 10 N/mm, which conforms to the specifications mentioned in the preamble to the present description.

If there are shocks or vibrations to be damped, the pressure in the chambers must be reduced to make the system of the invention more flexible, or to give it the capacity for rapid damping of vibrations. To this end, the means for adjusting the pressure in the chambers $12_1$ and $12_2$ comprise a second two-way solenoid valve 20 mounted on a line 21 for venting the corresponding chamber. By appropriately controlling the time for which the solenoid valve 20 is open, the pressure in each of the chambers $12_1$, $12_2$ can be reduced to a suitable predetermined value, for example 25 bars. Accordingly, the pressure in the chambers could be varied as follows during a launch vehicle flight sequence (this is merely one illustrative and non-limiting example):

while boosters 2 and 3 are operating: 45 bars;
while stage 1 is operating: 45 bars;
on jettisoning nose cap 7: 25 bars;
on jettisoning first stage: 25 bars;
during flight of second stage 5: 45 bars.

High-pressure pipes, guaranteed to 50 bars, manufactured by the Swiss company GROWAG or the French company TITEFLEX can be used for the chambers $12_1$ and $12_2$.

It is now clear that the system of the invention can achieve the stated objectives, namely protecting the relatively fragile structure of the satellite from force flux maxima, shocks and vibrations to which the launch vehicle is subjected during the various phases of a launch, whilst maintaining a sufficiently rigid connection between the launch vehicle and the satellite to secure the satellite.

The system of the invention is also very reliable because the insertion of these chambers between the ribs 10a and 11a projecting from the rings means that a leak from either or both chambers does not eliminate the connection between the rings 10 and 11.

FIGS. 6 to 8 show variants of the system from FIGS. 4 to 5 by way of example only.

The system shown in FIG. 6 comprises two rigid rings 10' and 11' with respective ribs 10'a and 11'a and three identical coaxial annular chambers $12_1$, $12_2$ and $12_3$. The outer chambers $12_1$ and $12_3$ are compressed when the rings 10' and 11' are moved axially toward by forces circulating in the structure of the launch vehicle. The central chamber $12_2$ is compressed between the ribs 10'a and 11'a when the rings 10' and 11' are moved axially away from each other.

To reduce the volume of gas contained in the chambers $12_1$, $12_2$, $12_3$, and in this way to increase the stiffness of the system, respectively cylindrical elastic material (for example rubber) bodies $15_1$, $15_2$, $15_3$ can be inserted in the chambers.

The system shown in FIG. 7 comprises two rings 10" and 11" each comprising two ribs 10"a, 10"b and 11"a, 11"b, respectively, and four annular chambers $12_1$, $12_2$, $12_3$, $12_4$. The first three chambers $12_1$, $12_2$, $12_3$ have the same function as the corresponding chambers of the FIG. 6 embodiment and the fourth chamber ($12_4$) has the same function as the chamber $12_2$. Note that these chambers have an oval cross-section with the shorter axis parallel to the axis X of the chambers. This shape, which can be obtained by crushing a circular section pipe, has the advantage of increasing the stiffness of the suspension system of the invention and therefore how firmly the units or the satellite suspended by the system are held in place.

The FIG. 8 system includes two rigid annular members 10''' and 11''' respectively comprising two ribs 10'''a and 10'''b and three ribs 11'''a, 11'''b and 11'''c and a single gas chamber $12_0$ conformed to be interleaved with a labyrinthine profile between the two annular members. The chamber has a plurality of successive parts, each of which is clamped between two facing faces of two ribs, one on the member 10''', the other on the member 11'''. Clearly relative movement of the ring 10''' and 11''' is countered by elastic deformation of the various parts of the chamber $12_0$, each of which has substantially the same function as the four chambers of the system shown in FIG. 7.

The chamber $12_0$ can be made by deforming a flexible cylindrical pipe or by extruding a material with the profile of the cross-section of the chamber.

FIG. 9 of the accompanying drawings shows a second embodiment of the system in accordance with the invention comprising annular fluid chambers $12'_1$, $12'_2$ whose walls are rigid, not flexible.

This system include rings 10"" and 11"" similar to those of the systems described above and mounted between a satellite and an adapter skirt by means of bolts in respective holes 13 and 14.

The rings 10"" and 11"" are shaped to slide axially on each other and to retain a fluid in the two annular chambers $12'_1$ and $12'_2$ whose walls they delimit.

To this end, the rings 10"" and 11"" are provided with respective ribs 10""a and 11""a which bear on the respective rings 11"" and 10"", with appropriate seals, to delimit the chambers $12'_1$ and $12'_2$ whose volumes vary in opposite directions when the rings are moved axially closer together or farther part by the forces transmitted, just like the chambers $12_1$ and $12_2$ of the embodiment shown in FIG. 5. The operation of the system shown in FIG. 9 is therefore similar to that shown in FIG. 5.

However, experiments have shown that force flux maxima are attenuated more efficiently by the system shown in FIG. 9 than by that shown FIG. 5, by a factor of approximately 10.

The variant of the FIG. 9 system shown in FIG. 10 further includes a plurality of coil springs $22_i$ disposed between the rings 10"" and 11"" on pins $23_i$ to filter shocks, for example at the level of the holes 13, 14, as shown. Otherwise, this variant is very similar to the system shown in FIG. 9.

The systems shown in FIGS. 9 and 10 could of course include more than two chambers, like the systems shown in FIGS. 6 and 7, in which case they would be provided with additional ribs on the facing rings.

Similarly, the systems shown in FIGS. 5 to 8 could include shock-absorber springs just like that from FIG. 10.

In this way it is possible to produce a suspension system having a diameter of 2.6 m and a height of a few centimeters, for example, suitable for installation on the base 6b of the skirt 6 to protect the satellite 4 fixed to the other base 6a of the skirt.

Of course, the invention is not limited to the embodiments described and shown, which are merely given by way of example.

The system of the invention could therefore incorporate a single chamber wound into a plurality of adjacent annular turns, this chamber replacing the stacked independent annular chambers of the embodiments shown in FIGS. 5, 6 and 7, for example.

Likewise, the system of the invention could therefore be installed in a launch vehicle elsewhere than at the base of an on-board satellite, for example between two other components of the launch vehicle, or in a supporting structure such as an adapter skirt, with a system of the type shown in FIG. 8, for example.

What is claimed is:

1. A system for suspending a payload in a launch vehicle for launching said payload into space, said system comprising: a) at least one variable geometry annular fluid chamber installed between said launch vehicle and said payload, and b) a first rigid coupling member and a second rigid coupling member fixed on either side of said chamber to said payload and to the launch vehicle, respectively, so as to transmit forces between them via said at least one variable geometry annular fluid chamber, said at least one variable geometry annular fluid chamber having a flexible wall, said at least one variable geometry annular fluid chamber including at least one first annular fluid chamber and one second annular fluid chamber superposed axially, and ribs extending from the rigid members respectively compressing the at least one first annular fluid chamber or the one second annular fluid chamber when said rigid members are respectively subjected to forces tending to move them closer together or further apart.

2. A system according to claim 1, wherein said at least one variable geometry annular fluid chamber and said first rigid coupling member and said second rigid coupling member are coextensive and coaxial with a longitudinal axis common to the launch vehicle and the payload.

3. A system according to claim 2, wherein said ribs extending from said first rigid coupling member and said second rigid coupling member each include at least one external rib and one internal rib, respectively, separated axially by said at least one variable geometry annular fluid chamber.

4. A system according to claim 1, wherein said at least one variable geometry annular fluid chamber is delimited by complementary surfaces of said first rigid coupling member and said second rigid coupling member, respectively, and said rigid coupling members are mobile relative to each other along a longitudinal axis of the launch vehicle.

5. A system according to claim 1, wherein the ribs of said first rigid coupling member and said second rigid coupling member are interleaved with each other with said at least one variable geometry annular fluid chamber between faces of each pair of facing faces of said interleaved ribs.

6. A system according to claim 1, wherein at least one third fluid chamber is coaxial with the at least one first annular fluid chamber and the one second annular fluid chamber.

7. A system according to claim 6, wherein a fourth fluid chamber is coaxial with the at least one annular fluid chamber, the one second annular fluid chamber and the at least one third fluid chamber.

8. A system according to claim 1, wherein said at least one variable geometry annular fluid chamber has an oval cross-section.

9. A system according to claim 1, wherein said at least one variable geometry annular fluid chamber is lined internally with an elastic material.

10. A system according to claim 1, wherein said at least one variable geometry annular fluid chamber is a gaseous fluid.

11. A system according to claim 1, wherein said at least one variable geometry annular fluid chamber contains an imcompressible fluid.

12. A system according to claim 11, wherein means for adjusting pressure of the incompressible fluid is connected to the at least one variable geometry annular fluid chamber.

13. A system according to claim 11, wherein means for selectively establishing communication between at least one variable geometry annular fluid chamber contains an incompressible fluid and a tank containing a compressible fluid.

14. A system according to claim 2, wherein a plurality of springs are disposed between said first and second rigid coupling members so as to be compressed when said members are pushed towards each other along a longitudinal axis of the launch vehicle.

15. A system for suspending a payload in a launch vehicle for launching said payload into space, said system comprising a) at least first and second superimposed variable geometry annular fluid chambers installed between said launch vehicle and said payload, and b) first and second rigid members fixed, on either side of said superimposed chambers, to said payload and to the launch vehicle, respectively, so as to transmit forces between them via said chambers, said annular fluid chambers and said rigid members being coextensive and coaxial with a longitudinal axis common to the launch vehicle and the payload, said first and second rigid annular members each having at least one external rib and one internal rib, respectively, said ribs respectively compressing the first annular chamber or the second annular fluid chamber when said rigid members are respectively subjected to forces tending to move them closer together or further apart.

16. A system according to claim 15, wherein said annular chambers have a flexible wall.

17. A system according to claim 15, further comprising at least a third fluid chamber coaxial with the other two chambers, disposed symmetrically with the first one relative to the second one.

18. A system according to claim 17, further comprising a fourth fluid chamber coaxial with the other three chambers and disposed symmetrically with the second chamber relative to the third chamber.

19. A system according to claim 15, wherein said chambers have an oval cross-section with a shorter axis parallel to an axis of said chambers.

20. A system according to claim 16, wherein the ribs of said first rigid annular member and said second rigid annular member are interleaved with each other with said fluid chamber between faces of each pair of facing faces of said interleaved ribs.

21. A system according to claim 15, wherein said chambers are lined internally with an elastic material.

22. A system according to claim 15, wherein said annular chambers are delimited by complementary surfaces of said first rigid member and said second rigid member, respectively, and said rigid members are mobile relative to each other along a longitudinal axis of the launch vehicle.

23. A system according to claim 15, wherein said chambers contain a gaseous fluid.

24. A system according to claim 15, wherein said chambers contain an incompressible fluid.

25. A system according to claim 23, further comprising means for adjusting the pressure of the gaseous fluid in at least one fluid chamber.

26. A system according to claim 24, further comprising means for selectively establishing communication between at least one chamber containing an incompressible fluid and a tank containing a compressible fluid.

27. A system according to claim 16, further comprising a plurality of springs disposed between said first and second rigid members so as to be compressed when said members are pushed towards each other along a longitudinal axis of the launch vehicle.

* * * * *